United States Patent
Wakeford et al.

(10) Patent No.: US 8,998,726 B1
(45) Date of Patent: Apr. 7, 2015

(54) SYSTEM AND METHOD FOR ASSOCIATING A USER TO A SHARD BASED ON THIRD PARTY LATENCY

(71) Applicant: Kabam Inc., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 84 days.

(21) Appl. No.: 13/874,325

(22) Filed: Apr. 30, 2013

(51) Int. Cl.
*A63F 9/24* (2006.01)
*A63F 13/30* (2014.01)

(52) U.S. Cl.
CPC ...................... *A63F 13/12* (2013.01)

(58) Field of Classification Search
USPC ........................................... 463/42
See application file for complete search history.

(56) References Cited

U.S. PATENT DOCUMENTS

| | | | |
|---|---|---|---|
| 7,244,181 B2 | 7/2007 | Wang et al. | 463/42 |
| 7,634,569 B2 | 12/2009 | VanAntwerp et al. | 709/227 |
| 2011/0060821 A1 | 3/2011 | Loizeaux et al. | 709/224 |

*Primary Examiner* — Omkar Deodhar
(74) *Attorney, Agent, or Firm* — Pillsbury Winthrop Shaw Pittman LLP

(57) ABSTRACT

One aspect of the disclosure relates to facilitating association of a user of an online game to a shard based on aggregated data related to third party latency and further based on social graphs associated with the user. A first type of aggregated third party latency may be calculated based on one or more of: a plurality of first latencies from a device associated with the user to a first plurality of users associated with the first shard and a plurality of second latencies from the first plurality of users to the first shard. A second type of aggregated third party latency may be calculated based on one or more of: a plurality of first latencies from the device associated with the user to a second plurality of users associated with the second shard and a plurality of second latencies from the second plurality of users to the second shard.

23 Claims, 3 Drawing Sheets

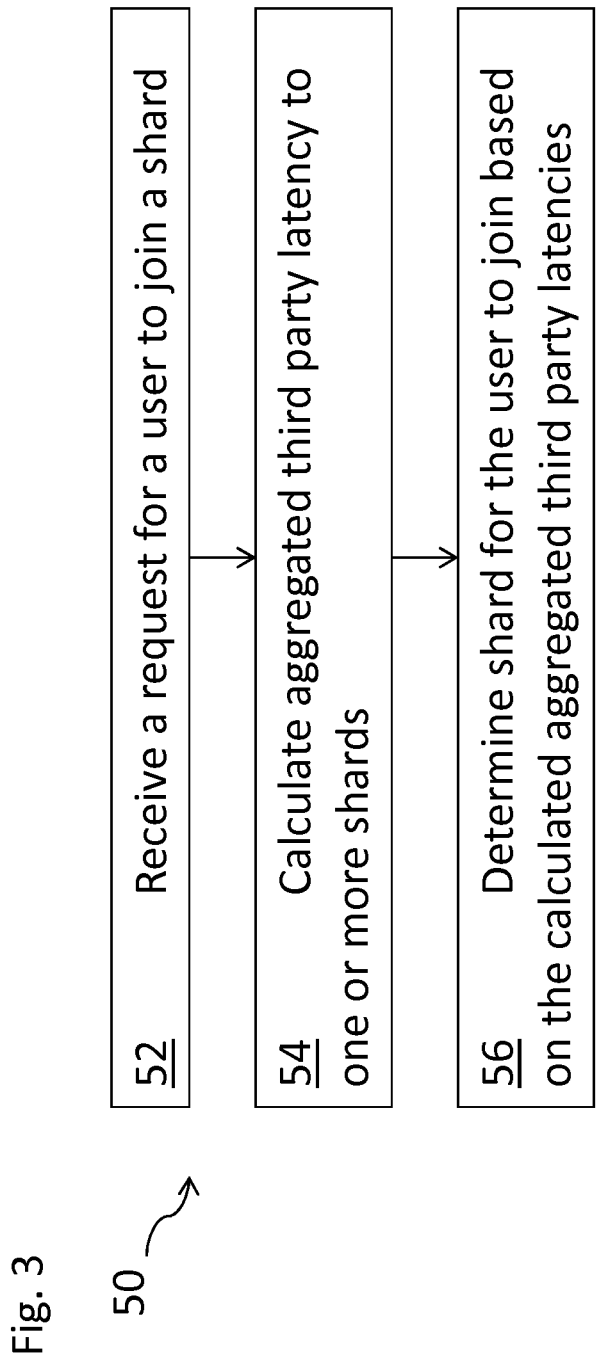

SYSTEM AND METHOD FOR ASSOCIATING A USER TO A SHARD BASED ON THIRD PARTY LATENCY

FIELD

The disclosure relates to associating a user of an online game to a shard based on aggregated data related to third party latency and further based on social graphs associated with the user.

BACKGROUND

Various techniques for assigning players of an online game to a shard are known. For example, conventional systems may place a player into a shard when the player joins the game, based solely on profile characteristics obtained when the player creates an account for the game.

Conventional systems, however, suffer from various drawbacks and inefficiencies relating to associating players of an online game to a shard. For example, conventional systems may fail to facilitate the association of a player of an online game to a shard based on aggregated data related to third party latency and further based on social graphs associated with the player.

SUMMARY

One aspect of the disclosure relates to facilitating association of a user of an online game to a shard. An online game, such as, for example, a massively multiplayer role-playing online game, may comprise a plurality of virtual worlds. The plurality of virtual worlds may be hosted on a respective plurality of shards, where each shard may comprise a set of users associated with that shard. A shard may comprise one or more servers that host a virtual world and facilitate interaction by the associated set of users with the hosted virtual world.

A system configured to facilitate association of a user of an online game to a shard may include one or more processors configured to execute compute program modules. The program modules may comprise a shard selection module, and/or other modules.

A shard selection module may be configured to determine, based on a first aggregated third party latency to a first shard and a second aggregated third party latency to a second shard, a shard for the user to join. The first aggregated third party latency may be calculated based on one or more of: a plurality of first latencies from a device associated with the user to a first plurality of users associated with the first shard and a plurality of second latencies from the first plurality of users to the first shard. The second aggregated third party latency may be calculated based on one or more of: a plurality of first latencies from the device associated with the user to a second plurality of users associated with the second shard and a plurality of second latencies from the second plurality of users to the second shard.

In some implementations, a method of facilitating association of a user of an online game to a shard may comprise: determining, based on a first aggregated third party latency to a first shard and a second aggregated third party latency to a second shard, a shard for the user to join, wherein the first aggregated third party latency is calculated based on one or more of: a plurality of first latencies from a device associated with the user to a first plurality of users associated with the first shard and a plurality of second latencies from the first plurality of users to the first shard, and wherein the second aggregated third party latency is calculated based on one or more of: a plurality of first latencies from the device associated with the user to a second plurality of users associated with the second shard and a plurality of second latencies from the second plurality of users to the second shard.

In some implementations, a non-transitory electronic storage media may store information related to facilitating association of a user of an online game to a shard. The stored information may comprise: a memory configured to store information related to one or more users of the online game and one or more shards in the system and instructions configured to cause a client computing platform to: determine, based on a first aggregated third party latency to a first shard and a second aggregated third party latency to a second shard, a shard for the user to join, wherein the first aggregated third party latency is calculated based on one or more of: a plurality of first latencies from a device associated with the user to a first plurality of users associated with the first shard and a plurality of second latencies from the first plurality of users to the first shard, and wherein the second aggregated third party latency is calculated based on one or more of: a plurality of first latencies from the device associated with the user to a second plurality of users associated with the second shard and a plurality of second latencies from the second plurality of users to the second shard.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an exemplary method of facilitating association of a user of an online game to a shard, according to an aspect of the invention.

DETAILED DESCRIPTION

Figure 1:
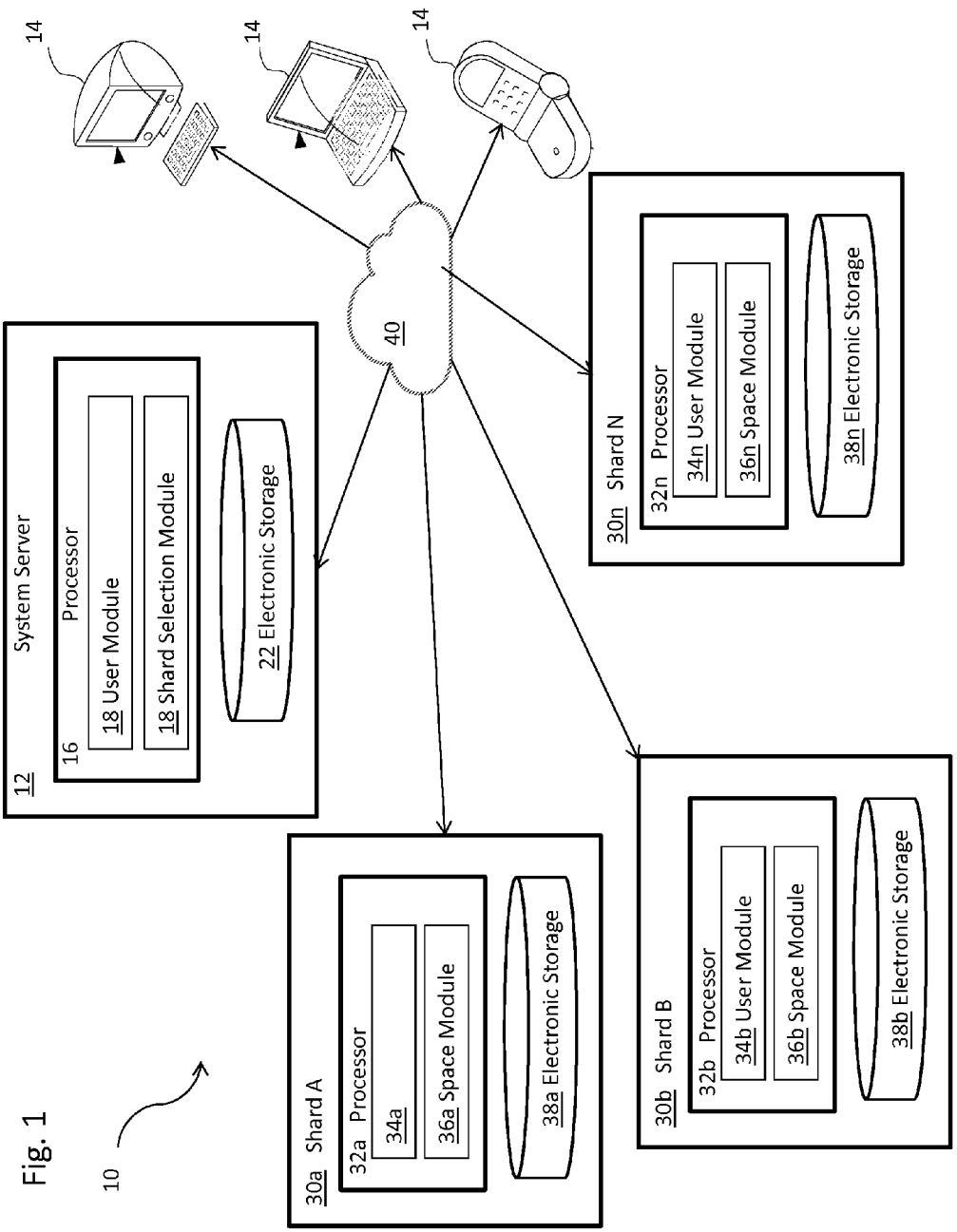
FIG. 1 illustrates an exemplary system configured to facilitate association a user of an online game to a shard, according to an aspect of the invention.

FIG. 1 illustrates a system 10 configured to facilitate association a user of an online game to a shard. In some implementations, system 10 may include a game server 12 and a plurality of game shards 30a, 30b, . . . , 30n. The game server 12 may be configured to provide administrative and management functionality for the online game, including, for example, an ability to associate a user with one of the plurality of game shards 30a, 30b, . . . 30n. The plurality of game shards 30a, 30b, . . . , 30n may host a respective plurality of game spaces in which an online game takes place. The plurality of game shards 30a, 30b, . . . , 30n and the game server 12 may be configured to communicate with one or more client computing platforms 14 according to a client/server architecture.

The users may access system 10 and/or a respective virtual space via client computing platforms 14.

The game shard 30a may be configured to execute one or more computer program modules. Other game shards 30b, . . . , 30n may be configured in a manner the same or similar as game shard 30a. The computer program modules may include one or more of a user module 32a, a space module 34a, and/or other modules.

The user module 32a may be configured to access and/or manage one or more user profiles and/or user information associated with users of the system 10. The one or more user profiles and/or user information may include information stored by game shard 30a, one or more of the client computing platforms 14, information from game server 12, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a type of client computing device associated with the user, a latency between a client computing device of the user and a shard to which the user is joined, a phone number associated with a user, and/or other information related to users.

Space module 34a may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 34a. Expressions of the instance executed on the clients may include space logic that effectively provides for execution of a limited version of the instance on a client that is synchronized and/or verified with state information received from space module 34a. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 34a is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 34a, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via respective client computing platforms 14. Communications may be routed to and from the appropriate users through game shard 30a (e.g., through space module 34a).

The game server 12 may be configured to execute one or more computer program modules. The computer program modules may include one or more of a user module 18, a shard selection module 20, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a type of client computing device associated with the user, a latency between a client computing device of the user and a shard to which the user is joined, a phone number associated with a user, and/or other information related to users.

Shard selection module 20 may be configured to determine a shard for the user to join from the plurality of shards 30a, 30b, . . . , 30n in the system 10. The determination of which shard to choose may be based on a comparison of a respective aggregated third party latency to each shard 30a, 30b, . . . , 30n. Aggregated third party latency to an individual shard 30a may be calculated in various ways.

A latency from one component (e.g., the device associated with the user) to another component (e.g., a device associated with another user, an individual shard 30a, etc.) may be obtained from user profile information maintained by a user module 18 of the game server, a user module 32a of an individual shard 30a, from information received from the user, through calculation of the latency (e.g., by pinging the component, and/or other methods of calculating latency), and/or by other methods of obtaining information related to latency between two components.

In some implementations, a first type of aggregated third party latency to the individual shard 30a may be based on latency from a device associated with the user to the one or more devices of the respective one or more users already associated with the individual shard 30a. For example, the first aggregated third party latency for an individual shard 30a may be based on an average latency from the device associated with the user to the one or more devices associated with the respective one or more users joined to the individual shard 30a. In another example, the first aggregated third party latency may be based on a median latency of the latencies between the device associated with the user and the one or more devices of the respective one or more users joined to the shard. Other types of values or calculations of values of first aggregated third party latency from the device associated with the user to the one or more devices of the respective one or more users may be used.

In some implementations, a second type of aggregated third party latency may be based on latency from the one or more users associated with the individual shard 30a to the individual shard 30a itself. For example, the second aggregated third party latency for an individual shard 30a may be based on an average latency from the one or more devices associated with the respective one or more users and the individual shard 30a. In another example, the second aggregated third party latency may be based on a median latency of the latencies between the one or more devices of the respective one or more users and the individual shard 30a. Other types of values or calculations of values of second aggregated third party latency from the one or more devices of the respective one or more users to the individual shard 30a may be used.

In some implementations, aggregated third party latency may be based on a combination of one or more ways in which to calculate aggregated third party latency. For example, for an individual shard 30a, aggregated third party latency may be calculated based on a combination of one or more of: the first aggregated third party latency (e.g., latencies from the device associated with the user to the one or more users associated with the individual shard 30a, etc.), second aggregated third party latency (e.g., latencies from the one or more users to the individual shard 30a, etc.), and/or other aggregated third party latencies.

Figure 2:
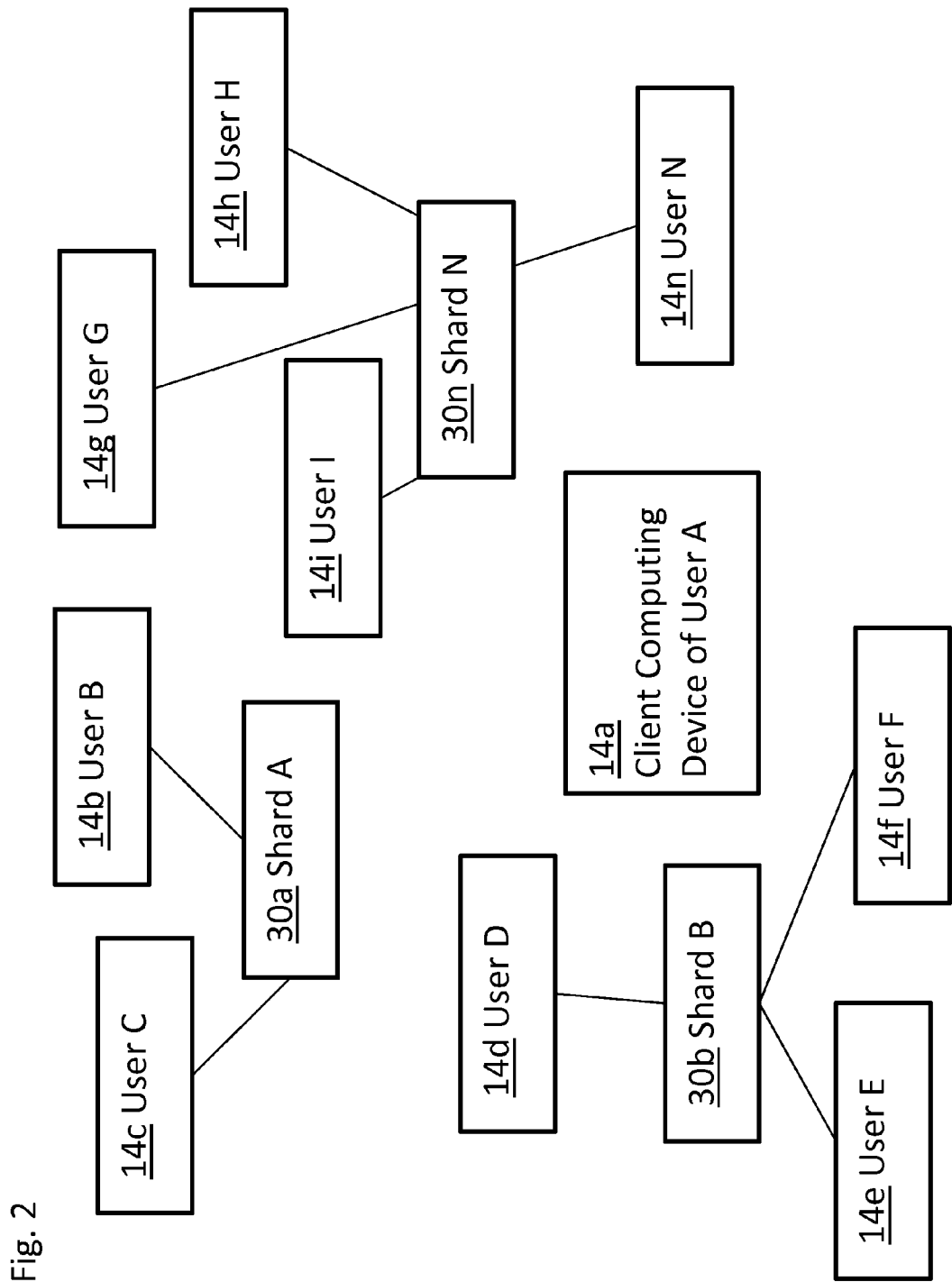
FIG. 2 illustrates an exemplary depiction of the associations between an exemplary plurality of users and an exemplary plurality of shards of an online game, according to an aspect of the invention.

FIG. 2 illustrates an exemplary simplified depiction of associations between an exemplary plurality of users A, B, . . . , N and an exemplary plurality of shards 30a, 30b, . . . , 30n of an online game in system 10. In the exemplary depiction, user A (associated with client computing device 14a) may request to join one of the plurality of shards 30a, 30b, . . . , 30n in the system 10. For example, shard selection module 20 may be configured to determine which of the plurality of shards 30a, 30b, . . . , 30n that user A should join.

Shard selection module 20 may determine a first type of aggregated third party latency in the exemplary system of FIG. 2. Shard selection module 20 may calculate, for each individual shard 30a, 30b, . . . , 30n, a latency from the client computing device 14a of user A to the individual users associated with each individual shard 30a, 30b, . . . , 30n. For example, for shard A (30a), shard selection module 20 may calculate a latency from client computing device 14a of user A to client computing device 14b of user B and a latency from client computing device 14a of user A to client computing device 14c of user C. Shard selection module may calculate the first type of aggregated third party latency to shard A (30a) based on the calculated latencies from the client computing device 14a to respective client computing devices 14b and 14c. Shard selection module 20 may calculate the first type of aggregated third party latency in a same or similar manner for shards B, . . . , N (30b, . . . , 30n).

Shard selection module 20 may determine a second type of aggregated third party latency in the exemplary system of FIG. 2. Shard selection module 20 may calculate, for each individual shard 30a, 30b, . . . , 30n, a latency from shard A (30a) to the individual users associated with each individual shard 30a, 30b, . . . , 30n. For example, for shard A (30a), shard selection module 20 may calculate a latency from shard A (30a) to client computing device 14b of user B and a latency from shard A (30a) to client computing device 14c of user C. Shard selection module may calculate the second type of aggregated third party latency to shard A (30a) based on the calculated latencies from shard A (30a) to respective client computing devices 14b and 14c. Shard selection module 20 may calculate the second type of aggregated third party latency in a same or similar manner for shards B, . . . , N (30b, . . . , 30n).

Shard selection module 20 may determine an aggregated third party latency in the exemplary system of FIG. 2 based on a combination of one or more ways in which to calculate aggregated third party latency. For example, for shard A (30a), aggregated third party latency may be calculated based on a combination of one or more of: the first aggregated third party latency (e.g., latencies from the device associated with the user to the one or more users associated with the individual shard 30a, etc.), second aggregated third party latency (e.g., latencies from the one or more users to the individual shard 30a, etc.), and/or other aggregated third party latencies. Shard selection module 20 may calculate an aggregated third party latency in a same or different manner for shards B, ..., N (30b, ..., 30n).

Returning to FIG. 1, the shard selection module 20 may be configured to determine a subset of the plurality of shards 30a, 30b, ..., 30n which the user may join. The shard selection module 20 may determine an individual shard 30a from the subset of shards 30a, 30b, ..., 30n for the user to join based on, for example, aggregated third party latencies associated with the respective subset of shards 30a, 30b, ..., 30n. The shard selection module 20 may determine the subset of the plurality of shards 30a, 30b, 30n based on one or more factors. The one or more factors may include, for example, a geographic proximity of the device associated with the user to the respective plurality of shards, one or more characteristics of the respective plurality of shards. An individual characteristic may comprise, for example, device type of devices associated with the users of the shard; user type of the users of the shard; skill level of the users of the shard; a correlative profile characteristic of the users of the shard, a version of the online game available at the shard, and/or other characteristics.

In some implementations, the shard selection module 20 may apply a weight to one or more of the aggregated third party latencies of one or more shards when performing a comparison of the plurality of shards 30a, 30b, ..., 30n. The shard selection module 20 may apply a weight to an individual shard 30a based on one or more factors. The factors may include, for example, geographic proximity of the individual shard 30a to the user, characteristics of users already joined to the individual shard 30a, types of cohorts of users already joined to the individual shard 30a, an aggregated device measurement of the individual shard 30a, an aggregated relationship measurement, and/or other factors. The shard selection module 20 may calculated an aggregated third party latency for an individual shard 30a by also applying any weights associated with the individual shard 30a during calculation. In some examples, one type of weight may be applied during one calculation of latency for an individual shard 30a whereas another type of weight may be applied during another calculation of latency for the individual shard 30a. The shard selection module 20 may store correlations between one or more types of weights to be applied during different calculations of latency for an individual shard 30a. In some examples, the correlations of types of weights to be applied during different calculations of latencies for an individual shard 30a may vary based on the individual shard 30a.

An aggregated device measurement for an individual shard 30a may indicate, for example, an amount of devices associated with the one or more users of the individual shard 30a of a same type as the device associated with the user. Information relating to a type of device of the one or more users of the individual shard 30a may be obtained from user profile information maintained by a user module 18 of the game server, a user module 32a of an individual shard 30a, from information received from the user, and/or by other methods of obtaining information related to device type. In some implementations, the aggregated device measurement may be a calculation of a proportion of the one or more users with a device of the same type related to the overall number of the one or more users. In some implementations, a score may be associated with each of the one or more users, where the score is based on the type of device of the individual user. For example, an individual user with a device of the same type as the user's device may be given a score of one, and an individual with a device of a type different from the user's device may be given a lower score. The score may depend, for example, upon one or more of: speed associated with the type of device, latency associated with the type of device, and/or other characteristics of the type of device. The aggregated device measurement may comprise an average, a median, and/or other calculation of the scores associated with the one or more users of the individual shard 30a based on type of device.

An aggregated relationship measurement for an individual shard 30a may indicate, for example, an amount of relationships between the user and the one or more users joined to the individual shard 30a. Information relating to a relationship between the user and an individual user of the one or more users of the individual shard 30a may be obtained from user profile information maintained by a user module 18 of the game server, a user module 32a of an individual shard 30a, from information received from the user, from a social network associated with the online game, and/or by other methods of obtaining information related to relationships.

In some implementations, the relationship information may be obtained from a friend graph of the user and the one or more users of the individual shard 30a. The friend graph may be based on one or more social networks with which the user is connected. In some implementations, the friend graph may include information from a plurality of social networks with which the user is connected, and may include information relating to direct relationships, indirect relationships (e.g., relationships in which the user has a relationship with a third party and the third party has a relationship with a user of the shard), and/or other types of relationships.

In some implementations, the aggregated relationship measurement may be an indication of a number of relationships between the user and the respective one or more users of the individual shard 30a. In some implementations, the aggregated relationship measurement may be based on a type of relationship between the user and the respective one or more users of the individual shard 30a. For example, type of relationship may comprise a direct relationship, an indirect relationship, and/or other type of relationship. The aggregated relationship measurement may comprise, for example, a calculation of a number of relationships of a particular type between the user and the individual users of the one or more users.

In some implementations, a score may be associated with each of the one or more users, where the score is based on the type of relationship between the user and the respective one or more users. For example, an individual user with a number of relationships, where the number of relationships is in a first range of numbers of a plurality of ranges, may be given a first score, and an individual user with a number of relationships, where the number of relationships is in a second range of numbers of the plurality of ranges, may be given a second score. The aggregated relationship measurement may comprise an average, a median, and/or other calculation of the scores associated with the one or more users of the individual shard 30a.

The ways in which to calculate aggregated third party latency are not limited to the examples described herein.

The shard selection module 20 may select an individual shard 30a of the plurality of shards 30a, 30b, ..., 30n for the user to join based on a comparison of the aggregated third party latencies of the plurality of shards 30a, 30b, ..., 30n. In some implementations, the shard selection module 20 may select the shard with the lowest aggregated third party latency. In some implementations, the shard selection module 20 may also consider a latency from the device associated with the user to the individual shards 30a, 30b, ..., 30n when determining a shard for the user to join. In some implementations, the shard selection module may select the shard with the most optimal combination of one or more of: aggregated third party latency, aggregated relationship measurement, aggregated device measurement, and/or other characteristics. In some implementations, the shard selection module 20 may calculate an average of geographic distance from the user to the individual shard 30a and aggregated third party latency associated with the individual shard 30a, and may select an individual shard 30a with the lowest average score. The shard selection module 20 may use other methods (and/or other combinations of methods) of selecting a shard from the plurality of shards 30a, 30b, . . . , 30n as well and is not limited to the examples described herein.

In some implementations, the shard selection module 20 may be configured to facilitate selection of a shard to join by the user. For example, the shard selection module 20 may be configured to determine a predetermined number of shards which the user may join based on the aggregated third party latencies to the plurality of shards 30a, 30b, . . . , 30n. The predetermined number of shards may be based on one or more of: a percentile of shards, a particular number of shards, shards with an aggregated third party latency above a threshold value, shards with a first aggregated third party latency above a first threshold, shards with a second third party latency above a second threshold, shards with a geographic proximity within a certain geographic distance from the device associated to the user, a user input regarding a number of shards, and/or other amount of shards.

The shard selection module 20 may be configured to facilitate display of the predetermined number of shards. For example, the shard selection module 20 may be configured to facilitate display of information related to the predetermined number of shards via a user interface of the game server 12, an individual shard 30, the device associated with the user, and/or of another device. The shard selection module 20 may be configured to receive, from the user, via the user interface, a shard input indicating a shard that the user wishes to join from the displayed predetermined number of shards.

In some implementations, the shard selection module 20 is configured to receive one or more inputs corresponding to one or more characteristics by which the shard selection module 20 may select a shard for the user to join. For example, the shard selection module 20 may use the one or more characteristics to select a subset of shards for which to calculate aggregated latency. In another example, the shard selection module 20 may use the one or more characteristics to determine how to calculate aggregated latency for the plurality of shards 30a, 30b, . . . , 30n. The one or more characteristics may comprise, for example, one or more of a first latency for calculating first aggregated third party latency, a second latency for calculating second aggregated third party latency, a first latency and a second latency for calculating aggregated third party latency, an aggregated relationship measurement, an aggregated device measurement, a type of relationship by which to calculate the aggregated relationship measurement, and/or other characteristic.

In some implementations, each individual shard 30a, 30b, . . . , 30n may perform shard selection in a manner the same or similar to the shard selection module 20 of the game server 12. In some of these implementations, the game server 12 may not be included in the system 10. For example, an individual shard 30a closest in geographic proximity to the user may determine a shard for the user to join. In another example, an individual shard 30a that is most centered in geographic position of the plurality of shards 30a, 30b, . . . , 30n may determine a shard for the user to join. In another example, the individual shard 30a that will determine a shard for the user to join may be selected based on a load-balancing algorithm, such that the performance cost of determining shards for users to join may be more evenly split among the plurality of shards 30a, 30b, . . . , 30n. Other ways of determining which shard 30a will determine the shard for the user to join may be used.

The game server 12, plurality of game shards 30a, 30b, . . . 30n, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 22, one or more processors 16, and/or other components. Game server 12 may include communication lines, or ports to enable the exchange of information with a network 40, game shards 30a, 30b, . . . , 30n, other computing platforms 14, and/or other components. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 22 may comprise non-transitory storage media that electronically stores information. The electronic storage media of electronic storage 22 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may include one or more virtual storage resources (e.g., cloud storage, a virtual private network, and/or other virtual storage resources). Electronic storage 22 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18 and 20. Processor 16 may be configured to execute modules 18 and 20 by software; hardware; firmware; some combination of software, hardware, and/or firmware;

and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18 and 20 are illustrated in FIG. 1 as being implemented within a single processing unit, in implementations in which processor includes multiple processing units, one or more of modules 18 and 20 may be implemented remotely from the other modules. The description of the functionality provided by the different modules 18 and 20 described below is for illustrative purposes, and is not intended to be limiting, as any of modules 18 and 20 may provide more or less functionality than is described. For example, one or more of modules 18 and 20 may be eliminated, and some or all of its functionality may be provided by other ones of modules 18 and 20. As another example, processor 16 may be configured to execute one or more additional modules that may perform some or all of the functionality attributed below to one of modules 18 and 20.

Game shard 30*a* may include electronic storage 38*a*, one or more processors 32*a*, and/or other components. Game shard 30*a* may include communication lines, or ports to enable the exchange of information with a game server 12, network 40, other computing platforms 14, and/or other components. Illustration of game shard 30*a* in FIG. 1 is not intended to be limiting. Game shard 30*a* may include a plurality of hardware, software, and/or firmware components operating together to provide the functionality attributed herein to game shard 30*a*. For example, game shard 30*a* may be implemented by a cloud of computing platforms operating together as game shard 30*a*.

Electronic storage 38*a* may comprise non-transitory storage media that electronically stores information. The electronic storage media of electronic storage 38*a* may include one or both of system storage that is provided integrally (i.e., substantially non-removable) with game shard 30*a* and/or removable storage that is removably connectable to game shard 30*a* via, for example, a port (e.g., a USB port, a firewire port, etc.) or a drive (e.g., a disk drive, etc.). Electronic storage 38*a* may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38*a* may include one or more virtual storage resources (e.g., cloud storage, a virtual private network, and/or other virtual storage resources). Electronic storage 38*a* may store software algorithms, information determined by processor 32*a*, information received from game shard 30*a*, information received from client computing platforms 14, information received from game server 12, and/or other information that enables game shard 30*a* to function as described herein.

Processor(s) 32*a* is configured to provide information processing capabilities in game shard 30*a*. As such, processor 32*a* may include one or more of a digital processor, an analog processor, a digital circuit designed to process information, an analog circuit designed to process information, a state machine, and/or other mechanisms for electronically processing information. Although processor 32*a* is shown in FIG. 1 as a single entity, this is for illustrative purposes only. In some implementations, processor 16 may include a plurality of processing units. These processing units may be physically located within the same device, or processor 32*a* may represent processing functionality of a plurality of devices operating in coordination. The processor 16 may be configured to execute modules 34*a* and 34*b*. Processor 32*a* may be configured to execute modules 34*a* and 34*b* by software; hardware; firmware; some combination of software, hardware, and/or firmware; and/or other mechanisms for configuring processing capabilities on processor 32*a*. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 34*a* and 34*b* are illustrated in FIG. 1 as being implemented within a single processing unit, in implementations in which processor includes multiple processing units, one or more of modules 34*a* and 34*b* may be implemented remotely from the other modules. The description of the functionality provided by the different modules 34*a* and 34*b* described below is for illustrative purposes, and is not intended to be limiting, as any of modules 34*a* and 34*b* may provide more or less functionality than is described. For example, one or more of modules 34*a* and 34*b* may be eliminated, and some or all of its functionality may be provided by other ones of modules 34*a* and 34*b*. As another example, processor 32*a* may be configured to execute one or more additional modules that may perform some or all of the functionality attributed below to one of modules 34*a* and 36*a*. Other shards 30*b*, . . . , 30*n* may have a same or similar configuration, hardware, functionality, and/or other characteristics as shard 30*a*.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

FIG. 2 illustrates a method 50 of providing a customized user experience based on a spend frequency of a user in an online game. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, a request may be received by a user to join a shard in the online game. The request may be received when the user registers for the game, after a trial period ends in the online game for the user, at a predetermined time after the user registers, and/or at another time. The request may be automatically generated and sent to the game server, may be instantiated by the user, and/or may be communicated in another way. In some implementations, operation 52 may be performed by a shard selection module the same as or similar to shard selection module 20 (shown in FIG. 1 and described above).

At an operation 54, aggregated third party latency to one or more shards may be calculated. In some implementations, operation 54 may be performed by a shard selection module the same as or similar to shard selection module 20 (shown in FIG. 1 and described above).

At an operation 56, a shard may be determined for the user to join based on the calculated aggregated third party frequencies. In some implementations, operation 56 may be performed by a shard selection module the same as or similar to shard selection module 20 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate association of a user of an online game to a shard, the system comprising:
   one or more processors configured to execute one or more program modules, the program modules comprising:
      a shard selection module configured to:
         determine, based on a first aggregated third party latency to a first shard and a second aggregated third party latency to a second shard, a shard for the user to join,
         wherein the first aggregated third party latency is calculated based on one or more of: a plurality of first latencies from a device associated with the user to a first plurality of users associated with the first shard and a plurality of second latencies from the first plurality of users to the first shard, and calculating the first aggregated third party latency includes:
            determining an average first latency value for the plurality of first latencies;
            determining an average second latency value for the plurality of second latencies; and,
            determining the first aggregated third party latency based on the average first latency value and the average second latency value;
         wherein the second aggregated third party latency is calculated based on one or more of: a plurality of first latencies from the device associated with the user to a second plurality of users associated with the second shard and a plurality of second latencies from the second plurality of users to the second shard.

2. The system of claim 1, wherein the shard selection module is configured to:
   calculate a first user latency from the device associated with the user to the first shard and a second user latency from the device associated with the user to the second shard; and
   determine the shard for the user to join based on the first aggregated third party latency, the second aggregated third party latency, the calculated first user latency, and the calculated second user latency.

3. The system of claim 1, wherein calculating the first aggregated third party latency comprises:
   applying a first weight to the average first latency value;
   applying a second weight to the average second latency value; and
   determining the first aggregated third party latency based on the weighted average first latency value and the weighted second latency value.

4. The system of claim 3, wherein the first weight and the second weight are based on one or more of:
   an aggregated relationship measurement that indicates an amount of relationships between the user and a plurality of users of a shard; and
   an aggregated device measurement that indicates an amount of devices associated with the plurality of users of the shard of a same type as the device associated with the user.

5. The system of claim 4, wherein the aggregated relationship measurement is based on an amount of indirect relationships between the user and one or more users of the shard, wherein an indirect relationship comprises a relationship in which the user has a relationship with a third party and the third party has a relationship with the user of the shard.

6. The system of claim 4, wherein the aggregated relationship measurement is based on a friend graph of the user and the plurality of users of the shard, wherein the friend graph may be based on one or more social networks with which the user is connected.

7. The system of claim 1, wherein the shard selection module is configured to:
   facilitate display of a predetermined number of shards; and
   receive, from the user, a shard input indicating a shard that the user will join.

8. The system of claim 7, wherein the predetermined number of shards are displayed based on respective first aggregated third party latencies and respective second aggregated third party latencies.

9. The system of claim 7,
   wherein the predetermined number of shards are displayed based on closest geographic proximity to the device associated with the user, and
   wherein the shard selection module is configured to:
      receive one or more inputs corresponding to one or more characteristics by which the shard selection module selects a shard for the user to join, wherein the characteristics comprise one or more of: a first latency for calculating aggregated third party latency, a second latency for calculating aggregated third party latency, a first latency and a second latency for calculating aggregated third party latency, an aggregated relationship measurement, or an aggregated device measurement.

10. The system of claim 1, wherein the shard selection module is configured to:
   determine a subset of a plurality of shards which the user may join based on geographic proximity of the device associated with the user to the respective plurality of shards, wherein the subset comprises the first shard and the second shard.

11. The system of claim 1, wherein the shard selection module is configured to:
determine a subset of a plurality of shards which the user may join based on one or more characteristics of the respective plurality of shards, wherein the subset comprises the first shard and the second shard, wherein an individual characteristic may comprise: device type of devices associated with the users of the shard; user type of the users of the shard; skill level of the users of the shard; a correlative profile characteristic of the users of the shard, or a version of the online game available at the shard.

12. A computer-implemented method of facilitating association of a user of an online game to a shard, the method being implemented in a computer system comprising one or more physical processors, the method comprising:
determining, based on a first aggregated third party latency to a first shard and a second aggregated third party latency to a second shard, a shard for the user to join,
wherein the first aggregated third party latency is calculated based on one or more of: a plurality of first latencies from a device associated with the user to a first plurality of users associated with the first shard and a plurality of second latencies from the first plurality of users to the first shard, and calculating the first aggregated third party latency includes:
determining an average first latency value for the plurality of first latencies;
determining an average second latency value for the plurality of second latencies; and,
determining the first aggregated third party latency based on the average first latency value and the average second latency value;
wherein the second aggregated third party latency is calculated based on one or more of: a plurality of first latencies from the device associated with the user to a second plurality of users associated with the second shard and a plurality of second latencies from the second plurality of users to the second shard.

13. The method of claim 12, further comprising:
calculating a first user latency from the device associated with the user to the first shard and a second user latency from the device associated with the user to the second shard; and
determining the shard for the user to join based on the first aggregated third party latency, the second aggregated third party latency, the calculated first user latency, and the calculated second user latency.

14. The method of claim 1, wherein calculating the first aggregated third party latency comprises:
applying a first weight to the average first latency value;
applying a second weight to the average second latency value; and
determining the first aggregated third party latency based on the weighted average first latency value and the weighted second latency value.

15. The method of claim 14, wherein the first weight and the second weight are based on one or more of:
an aggregated relationship measurement that indicates an amount of relationships between the user and a plurality of users of a shard; and
an aggregated device measurement that indicates an amount of devices associated with the plurality of users of the shard of a same type as the device associated with the user.

16. The method of claim 15, wherein the aggregated relationship measurement is based on an amount of indirect relationships between the user and one or more users of the shard, wherein an indirect relationship comprises a relationship in which the user has a relationship with a third party and the third party has a relationship with the user of the shard.

17. The method of claim 15, wherein the aggregated relationship measurement is based on a friend graph of the user and the plurality of users of the shard, wherein the friend graph may be based on one or more social networks with which the user is connected.

18. The method of claim 12, further comprising
facilitating display of a predetermined number of shards; and
receiving, from the user, a shard input indicating a shard that the user will join.

19. The method of claim 18, wherein the predetermined number of shards are displayed based on respective first aggregated third party latencies and respective second aggregated third party latencies.

20. The method of claim 18, wherein the predetermined number of shards are displayed based on closest geographic proximity to the device associated with the user, the method further comprising:
receiving one or more inputs corresponding to one or more characteristics by which the shard selection module selects a shard for the user to join, wherein the characteristics comprise one or more of: a first latency for calculating aggregated third party latency, a second latency for calculating aggregated third party latency, a first latency and a second latency for calculating aggregated third party latency, an aggregated relationship measurement, or an aggregated device measurement.

21. The method of claim 12, further comprising:
determining determine a subset of a plurality of shards which the user may join based on geographic proximity of the device associated with the user to the respective plurality of shards, wherein the subset comprises the first shard and the second shard.

22. The method of claim 12, further comprising:
determining a subset of a plurality of shards which the user may join based on one or more characteristics of the respective plurality of shards, wherein the subset comprises the first shard and the second shard, wherein an individual characteristic may comprise: device type of devices associated with the users of the shard; user type of the users of the shard; skill level of the users of the shard; a correlative profile characteristic of the users of the shard, or a version of the online game available at the shard.

23. A non-transitory electronic storage media storing information related to facilitating association of a user of an online game to a shard, the stored information comprising:
a memory configured to store information related to one or more users of the online game and one or more shards in the system;
instructions configured to cause a client computing platform to:
determine, based on a first aggregated third party latency to a first shard and a second aggregated third party latency to a second shard, a shard for the user to join, wherein the first aggregated third party latency is calculated based on one or more of: a plurality of first latencies from a device associated with the user to a first plurality of users associated with the first shard and a plurality of second latencies from the first plurality of users to the first shard, and calculating the first aggregated third party latency includes:
  determining an average first latency value for the plurality of first latencies;
  determining an average second latency value for the plurality of second latencies; and,
  determining the first aggregated third party latency based on the average first latency value and the average second latency value;
wherein the second aggregated third party latency is calculated based on one or more of: a plurality of first latencies from the device associated with the user to a second plurality of users associated with the second shard and a plurality of second latencies from the second plurality of users to the second shard.

* * * * *